(12) United States Patent
Kamath et al.

(10) Patent No.: US 10,158,563 B2
(45) Date of Patent: Dec. 18, 2018

(54) FLOW BASED OVERLAY NETWORK

(71) Applicant: International Business Machines Corporation, Armonk, NY (US)

(72) Inventors: Dayavanti G. Kamath, Santa Clara, CA (US); Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/752,761

(22) Filed: Jun. 26, 2015

(65) Prior Publication Data

US 2015/0295819 A1 Oct. 15, 2015

Related U.S. Application Data

(63) Continuation of application No. 13/550,480, filed on Jul. 16, 2012, now Pat. No. 9,094,459.

(51) Int. Cl.
*H04L 12/721* (2013.01)
*H04L 29/06* (2006.01)
*H04L 12/715* (2013.01)

(52) U.S. Cl.
CPC .............. *H04L 45/38* (2013.01); *H04L 45/64* (2013.01); *H04L 69/22* (2013.01)

(58) Field of Classification Search
CPC .......... H04L 45/38; H04L 45/64; H04L 69/22
See application file for complete search history.

(56) References Cited

U.S. PATENT DOCUMENTS

| 7,693,149 B2 | 4/2010 | Cathey et al. |
| 8,274,895 B2 | 9/2012 | Rahman et al. |

(Continued)

FOREIGN PATENT DOCUMENTS

| CN | 101305561 A | 11/2008 |
| CN | 101471858 A | 7/2009 |

(Continued)

OTHER PUBLICATIONS

Mahalingam et al., "VXLAN: A Framework for Overlaying Virtualized Layer 2 Networks over Layer 3 Networks," Network Working Group, Internet Draft, Feb. 24, 2012, pp. 1-20.

(Continued)

*Primary Examiner* — Andrew Lai
*Assistant Examiner* — M Mostazir Rahman
(74) *Attorney, Agent, or Firm* — Zilka-Kotab, P.C.

(57) ABSTRACT

In one embodiment, a system includes a hardware processor and logic integrated with and/or executable by the processor, the logic being configured to receive an overlay packet, determine at least one characteristic of the overlay packet and/or inner packets of the overlay packet in order to classify the overlay packet into a classification, associate a flow identifier to the overlay packet, determine one or more policies to associate with the flow identifier, where the one or more policies are based on the at least one characteristic of the overlay packet and/or the inner packets of the overlay packet, and store the flow identifier in a header of the overlay packet, where the flow identifier is a string of characters of a predetermined length, the flow identifier being unique from all other flow identifiers in a particular overlay network and associated with an identified flow of the overlay packet.

13 Claims, 7 Drawing Sheets

(56) References Cited

U.S. PATENT DOCUMENTS

| | | | |
|---|---|---|---|
| 8,929,374 B2 | 1/2015 | Tonsing et al. | |
| 9,094,459 B2 | 7/2015 | Kamath et al. | |
| 2006/0114908 A1 | 6/2006 | Kalkunte et al. | |
| 2006/0251069 A1 | 11/2006 | Cathey et al. | |
| 2008/0304493 A1 | 12/2008 | Marr et al. | |
| 2009/0204723 A1 | 8/2009 | Tonsing et al. | |
| 2009/0296613 A1 | 12/2009 | Kahn et al. | |
| 2009/0300207 A1 | 12/2009 | Giaretta et al. | |
| 2010/0063988 A1 | 3/2010 | Khalid et al. | |
| 2010/0074256 A1 | 3/2010 | Seok et al. | |
| 2010/0188976 A1 | 7/2010 | Rahman et al. | |
| 2011/0243131 A1 | 10/2011 | Amir et al. | |
| 2012/0093160 A1 | 4/2012 | Tonsing et al. | |
| 2013/0021906 A1 | 1/2013 | Rahman et al. | |
| 2013/0064243 A1* | 3/2013 | Akiyoshi | H04L 45/38 370/389 |
| 2013/0163594 A1* | 6/2013 | Sharma | H04L 45/64 370/392 |
| 2013/0301641 A1* | 11/2013 | Anand | H04L 63/0227 370/389 |
| 2014/0016501 A1 | 1/2014 | Kamath et al. | |

FOREIGN PATENT DOCUMENTS

| | | |
|---|---|---|
| CN | 101924781 A | 12/2010 |
| CN | 102047622 A | 5/2011 |
| CN | 102047636 A | 5/2011 |
| CN | 102576345 A | 7/2012 |
| WO | 2012090354 A1 | 7/2012 |

OTHER PUBLICATIONS

Final Office Action from U.S. Appl. No. 13/550,480, dated Aug. 27, 2014.

Non-Final Office Action from U.S. Appl. No. 13/550,480, dated Jan. 3, 2014.

Notice of Allowance from U.S. Appl. No. 13/550,480, dated Jan. 22, 2015.

Notice of Allowance from U.S. Appl. No. 13/550,480, dated Mar. 13, 2015.

Kamath et al., U.S. Appl. No. 13/550,480, filed Jul. 16, 2012.

Office Action from Chinese Application No. 201310296041.5, dated Jan. 29, 2016.

* cited by examiner

700

| Policy ID | Policy |
|---|---|
| 0000 | DEFAULT_POLICY |
| 0001 | DROP_POLICY |
| 0002 | SERVICES_POLICY |
| 0003 | VNX_POLICY |
| 0004 | CUSTOMERX_POLICY |
| ... | ... |
| N | N_POLICY |

| Bucket ID | Flow ID | Policy ID |
|---|---|---|
| 0000 | 0x00 | 0x0000 |
| 0001 | 0x12337681 | 0x0002 |
| 0002 | 0x719746912 | 0x0003 |
| 0003 | 0x53234124 | 0x0004 |
| ... | ... | ... |
| X | 0xFLOWIDX | 0xX |
|  | 0xFFFFFFFFFFFFFFFF | 0x0001 |

FIG. 7B

FLOW BASED OVERLAY NETWORK

BACKGROUND

The present invention relates to data center infrastructure, and more particularly, this invention relates to a flow based overlay network architecture and components thereof.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch strips off the overlay header encapsulation, UDP transport header, and IP header, and delivers the original packet to the destination end station. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

Overlay networks are complex to manage. One reason for this complexity is that network administrators manage networks, while server administrators manage servers. Both the network and server administrators need to work together to manage an overlay network, which may make use of both entities in the overlay architecture. This added complexity may result in miscommunication resulting in some tasks being performed twice, some tasks not being performed (as an administrator may assume the other is handling it), and overall delay due to the cooperation being needed. Accordingly, it would be beneficial to have an overlay network which could be managed by one administrator.

SUMMARY

In one embodiment, a system includes a hardware processor and logic integrated with and/or executable by the processor, the logic being configured to: determine a flow identifier associated with an overlay packet, determine one or more policies associated with the flow identifier, and apply the one or more policies associated with the flow identifier, where the flow identifier is stored in a header of the overlay packet, and where the flow identifier is a numeric, alphanumeric, or hexadecimal string of a predetermined length, the flow identifier being unique from all other flow identifiers in a particular overlay network and associated with an identified flow of the overlay packet.

In another embodiment, a system for classifying traffic in an overlay network includes a hardware processor and logic integrated with and/or executable by the processor, the logic being configured to receive an overlay packet, determine at least one characteristic of the overlay packet or one or more inner packets of the overlay packet in order to classify the overlay packet into a classification, associate a flow identifier to the overlay packet, determine one or more policies to associate with the flow identifier, where the one or more policies are based on the at least one characteristic of the overlay packet or the one or more inner packets of the overlay packet, and store the flow identifier in a header of the overlay packet, where the flow identifier is a string of characters of a predetermined length, the flow identifier being unique from all other flow identifiers in a particular overlay network and associated with an identified flow of the overlay packet.

In yet another embodiment, a method for managing traffic in an overlay network includes determining a flow identifier associated with an overlay packet, determining one or more policies associated with the flow identifier, and applying the one or more policies associated with the flow identifier, wherein the flow identifier is stored in a header of the overlay packet, and wherein the flow identifier is a string of characters of a predetermined length, the flow identifier being unique from all other flow identifiers in a particular overlay network and associated with an identified flow of the overlay packet.

According to another embodiment, a method for classifying traffic in an overlay network includes receiving an overlay packet, determining at least one characteristic of the overlay packet or one or more inner packets of the overlay packet in order to classify the overlay packet into a classification, associating a flow identifier to the overlay packet, wherein the flow identifier is a string of characters of a predetermined length, the flow identifier being unique from all other flow identifiers in a particular overlay network and associated with an identified flow of the overlay packet, determining one or more policies to associate with the flow identifier, wherein the one or more policies are based on the at least one characteristic of the overlay packet or the one or more inner packets of the overlay packet, and storing the flow identifier in a header of the overlay packet.

In yet another embodiment, a computer program product for managing traffic on an overlay network includes a computer readable storage medium having computer readable program code embodied therewith, the embodied computer readable program code including computer readable program code configured to determine a flow identifier associated with an overlay packet, computer readable program code configured to determine one or more policies associated with the flow identifier, and computer readable program code configured to apply the one or more policies associated with the flow identifier, where the flow identifier is stored in a header of the overlay packet, and where the flow identifier is a numeric, alphanumeric, or hexadecimal string of a predetermined length, the flow identifier being unique from all other flow identifiers in a particular overlay network and associated with an identified flow of the overlay packet.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 7A is an exemplary policy database, according to one embodiment.

FIG. 7B is an exemplary flow and policy database, according to one embodiment.

DETAILED DESCRIPTION

Figure 1:
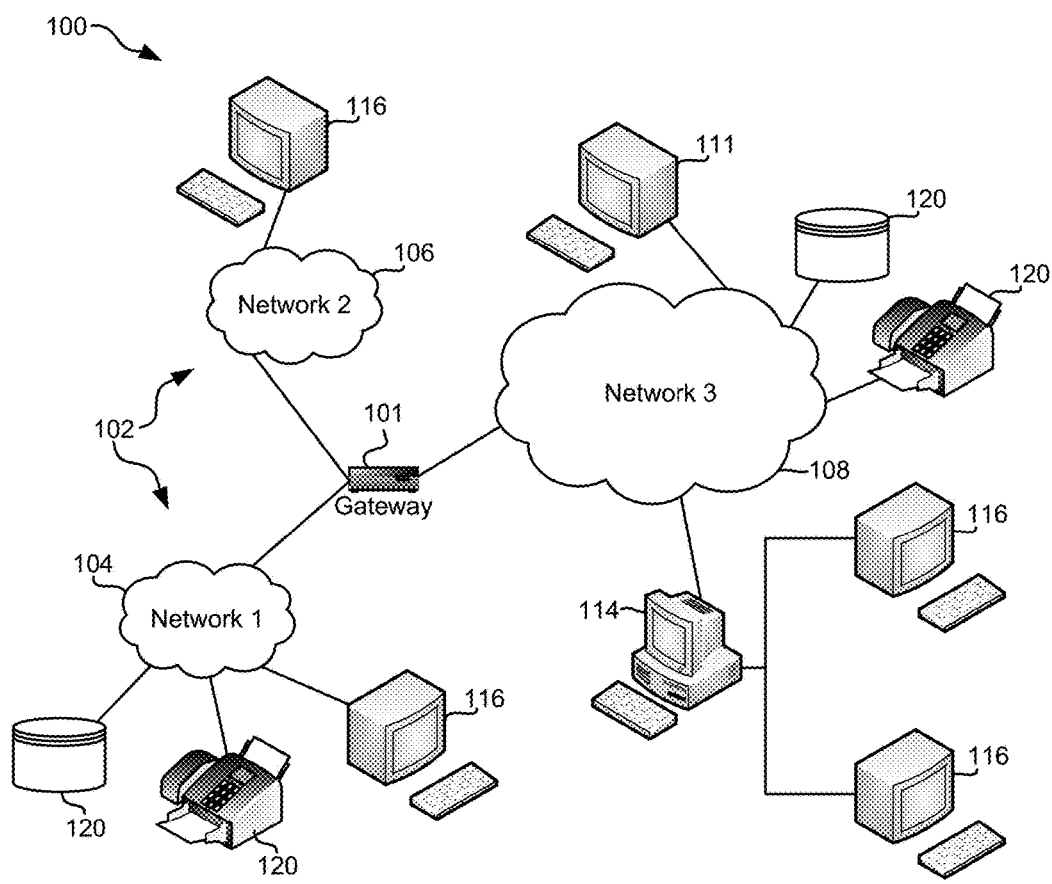
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, an overlay network may be controlled by a central or distributed controller thereby allowing for policy and provisioning to be provided to inner packets of overlay traffic. In one such embodiment, the controller may adhere to OpenFlow standards to operate in a software defined network (SDN).

In one general embodiment, a system includes a processor adapted for executing logic, logic adapted for determining a flow identifier associated with an overlay packet, logic adapted for determining one or more policies associated with the flow identifier, and logic adapted for applying the one or more policies associated with the flow identifier, wherein the flow identifier is stored in a header of the overlay packet.

In another general embodiment, a system for classifying traffic in an overlay network includes a processor adapted for executing logic, logic adapted for receiving an overlay packet, logic adapted for determining at least one characteristic of the overlay packet and/or one or more inner packets of the overlay packet in order to classify the overlay packet, logic adapted for associating a flow identifier to the overlay packet, logic adapted for determining one or more policies to associate with the flow identifier, wherein the one or more policies are based on the at least one characteristic of the overlay packet and/or the one or more inner packets of the overlay packet, and logic adapted for storing the flow identifier in a header of the overlay packet.

In yet another general embodiment, a method for managing traffic in an overlay network includes determining a flow identifier associated with an overlay packet, determining one or more policies associated with the flow identifier, and applying the one or more policies associated with the flow identifier, wherein the flow identifier is stored in a header of the overlay packet.

According to another general embodiment, a method for classifying traffic in an overlay network includes receiving an overlay packet, determining at least one characteristic of the overlay packet and/or one or more inner packets of the overlay packet in order to classify the overlay packet, associating a flow identifier to the overlay packet, determining one or more policies to associate with the flow identifier, wherein the one or more policies are based on the at least one characteristic of the overlay packet and/or the one or more inner packets of the overlay packet, and storing the flow identifier in a header of the overlay packet.

In yet another general embodiment, a computer program product for managing traffic on an overlay network includes a computer readable storage medium having computer readable program code embodied therewith, the computer readable program code including computer readable program code configured for determining a flow identifier associated with an overlay packet, computer readable program code configured for determining one or more policies associated with the flow identifier, and computer readable program code configured for applying the one or more policies associated with the flow identifier, wherein the flow identifier is stored in a header of the overlay packet.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
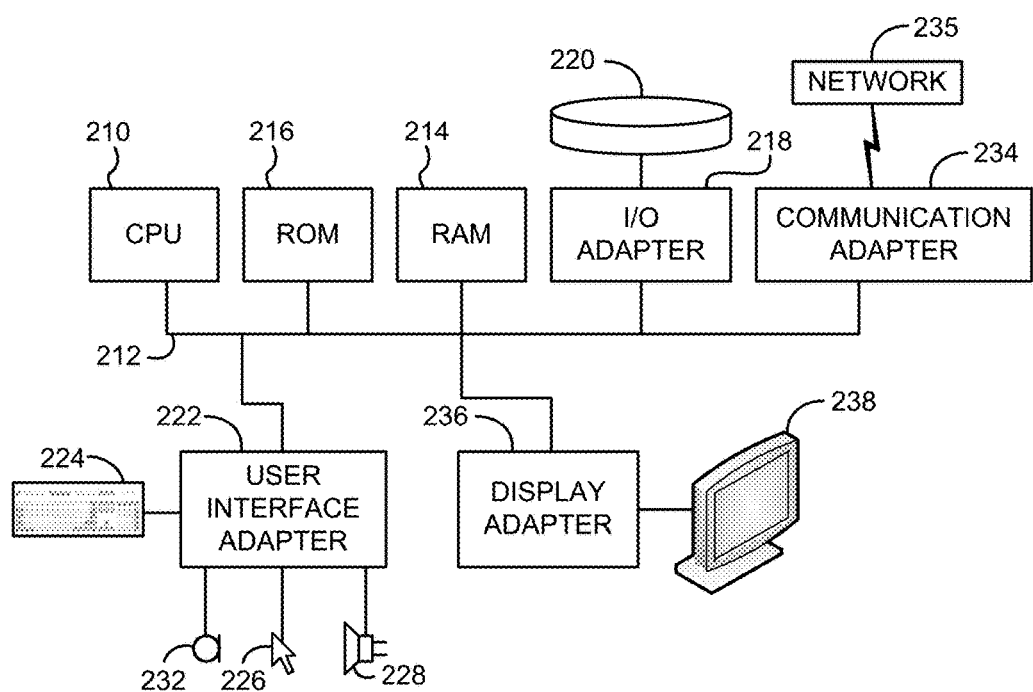
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
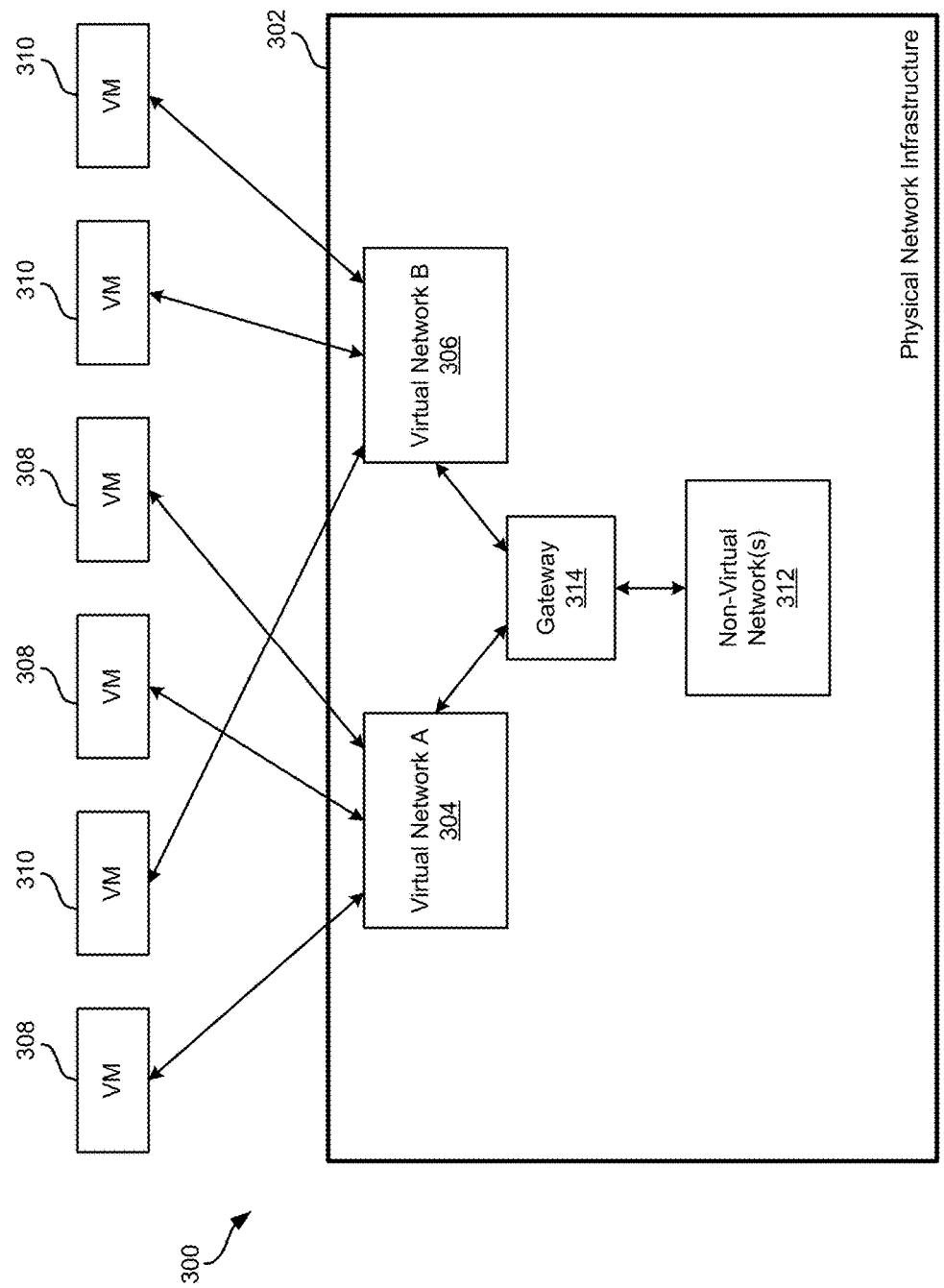
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may tunnel through one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer-3 (L3) domains, between one subnet to another subnet, internet protocol (IP) subnet to IP subnet, etc. But if it the architecture is similar to a large flat switch, in a very large layer-2 (L2) domain, then the VMs are aided in their attempt to move data across the architecture.

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling L2 packets over the L3 network by encapsulating the L2 packets into an overlay header. This may be performed using Virtual eXtensible Local Area Network (VXLAN) or some other overlay capable protocol, such as Network Virtualization using Generic Routing Encapsulation (NVGRE), locator/ID separation protocol (LISP), overlay transport virtualization (OTV), etc. The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc. In order for a device to manage a tunnel, there needs to be a mapping between an original packet's source address, destination address, and a tunnel identifier. In this way, a physical server is capable of forwarding the encapsulated original packet to the proper destination device.

According to various embodiments, a unique conversation identifier, referred to herein as a flow identifier (ID), between a source address and a destination address over an overlay network may be used to classify traffic and manage the overlay network more efficiently. The overlay network may be a VXLAN network, an NVRGE network, or any other overlay network known in the art. Each flow ID may be a unique integer, such as an 8-bit integer, 16-bit integer, 32-bit integer, 64-bit integer, 128-bit integer, 256-bit integer, etc. Each switching node in the overlay network is capable of identifying a flow ID that is included in an overlay packet received by the switching node. A switching node may be an overlay gateway, an overlay-capable switch, an overlay capable server running a hypervisor, or any other suitable device or software known in the art.

Each switching node, upon receiving an overlay packet having a flow ID associated therewith, may apply one or more policies associated with the flow ID, as described in more detail later. In addition, policy dictates an action or actions to be taken regarding a packet that includes or does not include an identified flow ID. If a policy is not specified for a flow ID, then a default policy may be applied.

Every overlay packet, according to one embodiment, includes the associated flow ID for the overlay packet somewhere in the overlay packet, such as in a header of the overlay packet, as described in more detail later. Each packet with overlay header carries Flow ID in the packet as part of overlay header.

In another embodiment, multiple flow IDs relating to multiple flows may be associated with a single policy. Furthermore, multiple policies may be associated with a single flow ID. The policies may be grouped and applied in groups, and one or multiple policies may be applied to a group of flow IDs.

The policies may be stored and searched for in a policy database, indexed for policy IDs. The policy database may be a central or distributed database including policies associated to a local overlay network, an entire data center, or any other portion.

Policies may be added, deleted, and/or updated by a network administrator and/or a server administrator. The policies or any portion thereof may be communicated to all the overlay switching entities in the network securely. Each overlay switching element may download the policy database to a memory thereof. A standard or proprietary protocol may be used for interaction between the policy server. Switches enforce policies which are discovered based on the flow ID.

Not all the overlay switches need the full policy database, and therefore the policy server may "intelligently" decide which portion of the policy database to send to each individual switch, thereby saving ternary content-addressable memory (TCAM) and/or lookup table space. The policy database may maintain a table of policy IDs and associated policies. It also keeps a mapping of flow IDs and policy IDs in a flow and policy database.

According to various alternative embodiments, a Distributed Overlay Virtual Ethernet (DOVE) Policy Server may provide flow IDs after classification. In one approach, the flow IDs may be administratively managed, e.g., an administrator may decide flows and assign flow IDs at the DOVE Policy Server. In another approach, the flow IDs may be assigned based on a conversation type, e.g., the flow ID={VM MAC, Domain ID, Application ID, etc.} For example, the Application ID may be viewed in the payload transport layer and the flow may be classified based on the Application ID.

Figure 4:
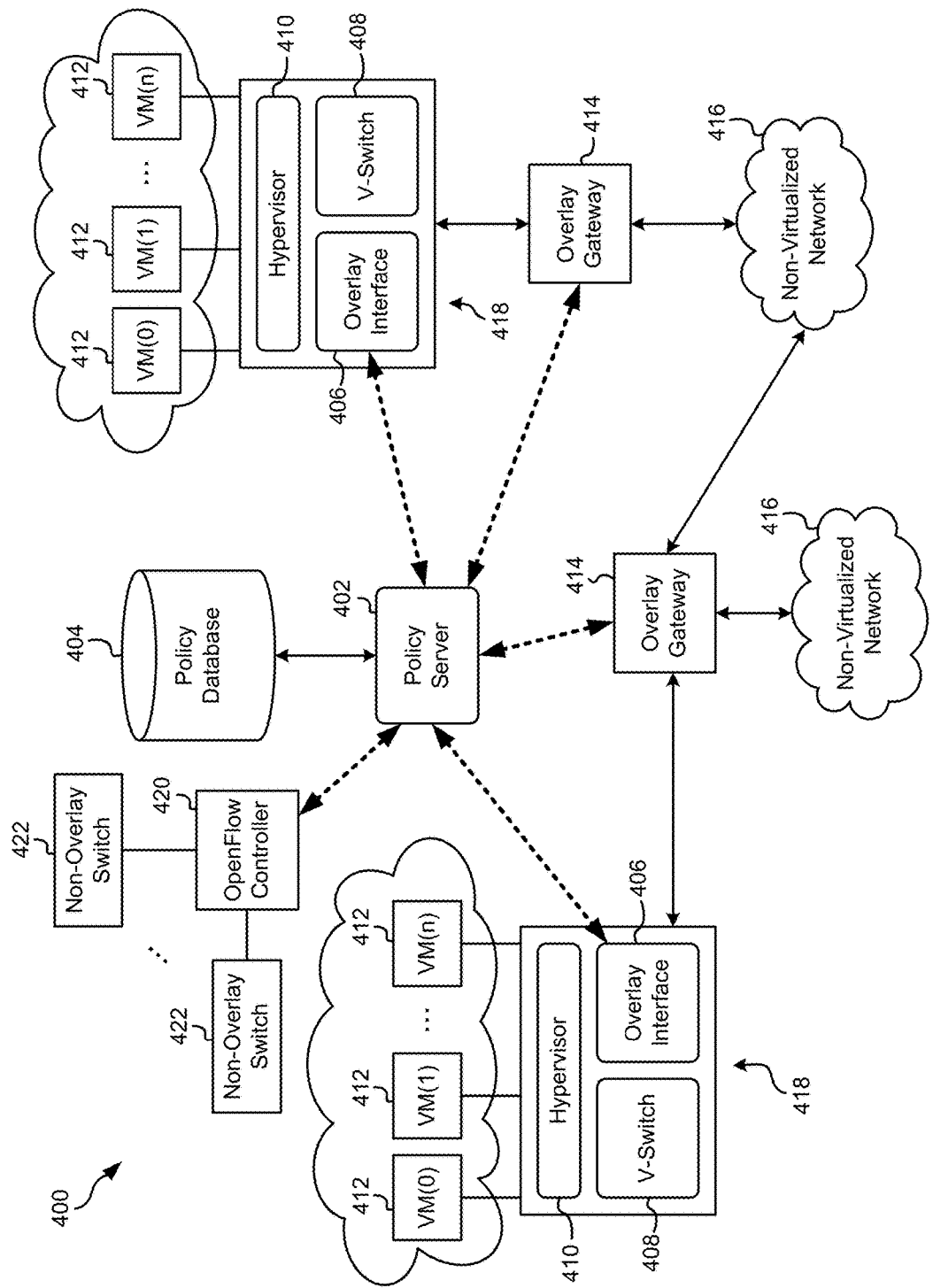
FIG. 4 shows a system, according to one embodiment.

Now referring to FIG. 4, a system 400 is shown according to one embodiment. A policy server 402 may be connected to one or more overlay-capable devices, such as overlay-capable servers 418, virtual overlay network gateways 414 for bridging between virtual networks 416 and the overlay network, etc. As shown, the Hypervisors 410 of each overlay-capable server 418 are capable of tunneling through the overlay network to other overlay-capable devices. Of course, this is a simplified architecture, and many more tunnels may exist, and many more overlay-capable devices (where tunnels are originated or terminated) may be in the overlay network, as would be understood by one of skill in the art.

Each Hypervisor 410 may be connected to any number of VMs 412. In addition, an overlay interface 406, such as a DOVE interface, a VXLAN interface, etc., may be located on a downstream side of each Hypervisor 410. A virtual overlay network gateway 414 may be provided to interface between the overlay network and any non-virtualized networks 416 present, any of which may be enabled for VXLAN or some other overlay network.

The policy server 402 is connected to a policy database 404, which may include policies, policy IDs, and flow IDs for flows in the overlay network.

In one embodiment, when an overlay packet is sent out of the domain where flow IDs are recognized, a device where the packet egresses from the domain may remove or strip the flow ID from the overlay packet's header.

In another embodiment, if a particular policy is to drop packets, then only ingress overlay-capable devices may have the policy to drop written to them, while other overlay-capable devices may not, to save memory space.

Each of the overlay-capable servers 418, the policy server 402, and/or the virtual overlay network gateways 414 may comprise a processor for executing logic, such as a central processing unit (CPU), a field programmable gate array (FPGA), an integrated circuit (IC), and application specific integrated circuit (ASIC), or some other suitable processor as known in the art.

According to one embodiment, access control lists (ACLs) may be applied by the policy server 402 to determine one or more actions to take upon receipt of overlay packets. In one embodiment, the ACL may indicate service (s) to perform on the inner packet(s) of the overlay packet. Any services known in the art may be applied to the inner packet(s), such as firewall services, intrusion prevention system (IPS) services, intrusion detection system (IDS), IPS/IDS services, server load balancing services, LAN optimization services, VPN services, video optimization services, network address translation (NAT) services, encryption services, decryption services, etc., among many other possibilities, as would be known to one of skill in the art. Each of these services may be independently activated, independently bypassed, or manually selected, as desired by a system administrator upon drafting the ACL.

In one embodiment, the policy server 402 may adhere to OpenFlow and may be capable of communicating via a recognized overlay protocol, such as VXLAN, NVGRE, etc. It may also assign and manage flow IDs, and may determine actions to take when an overlay packet does not have a flow ID. In addition, the policy server 402 may manage a time limit for individual flow IDs, such that the flow IDs may expire after a certain amount of time. Additionally, the policy server 402 may receive messages from overlay-capable devices indicating that a flow has been received that is associated with an expired flow ID, and may handle the situation as it occurs, by either dropping the packet, reassigning the flow ID, or performing some other action.

For multicast overlay packets, the policy server 402 may assign flow IDs to the multicast packet and may dictate which devices receive the multicast packet and which do not.

In another embodiment, the policy server 402 may be connected to an OpenFlow Controller 420, which may be connected to a plurality of non-overlay switches 422.

Figure 5:
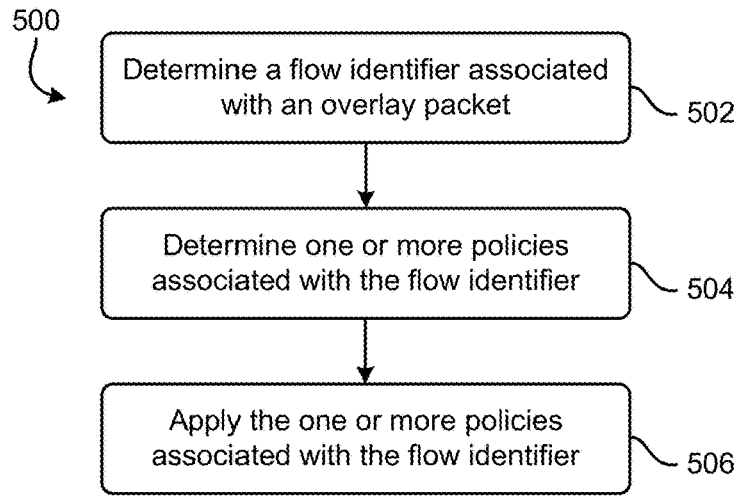
FIG. 5 is a flowchart of a method, according to one embodiment.

Now referring to FIG. 5, a flowchart of a method 500 for managing traffic on an overlay network is shown, according to one embodiment. The method 500 may be performed in accordance with the present invention in any of the environments depicted in FIGS. 1-4, 7A-7B, and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by an overlay switch, a processor (such as a CPU, an ASIC, a FPGA, etc.), an end point station (such as a Hypervisor, virtual overlay network gateway device, overlay switch capable of originating or terminating a tunnel, etc.), or computer program code embedded in a computer readable storage medium, in various non-limiting approaches.

As shown in FIG. 5, method 500 may initiate with operation 502, where a flow identifier associated with an overlay packet is determined. The flow identifier may be stored in a header of the overlay packet, in one approach. Specifically, the flow identifier may be stored within an overlay network header, an outermost L2 header, an outermost IP header, or an outermost UDP header of the overlay packet. For more details on where the flow identifier may be stored, reference is made to FIG. 8.

In one embodiment, if no flow identifier is associated with the overlay packet, the overlay packet may be sent to a policy server for further processing or it may be dropped, depending on a default processing instruction. In one embodiment, the policy server may adhere to OpenFlow standards and may communicate with DOVE interfaces on each overlay-capable server in the overlay network, along with any overlay gateways.

Referring again to FIG. 5, in operation 504, one or more policies associated with the flow identifier are determined. Any method of determining a policy may be used as known in the art, such as a one-to-one relationship between a flow identifier and a policy, a one-to-multiple relationship between a flow identifier and multiple policies, a multiple-to-one relationship between multiple flow identifiers and a single policy, etc.

In one embodiment, if no policy is associated with the flow identifier, the overlay packet may be sent to the policy server for further processing or it may be dropped, depending on a default processing instruction.

In another embodiment, the one or more policies may be indicated in one or more ACLs. According to one embodiment, the ACLs may be applied to determine one or more actions to take upon receipt of the overlay packet.

In yet another embodiment, each of the ACLs may indicate service(s) to perform on the inner packet(s) of the overlay packet. Any services known in the art may be applied to the inner packet(s), such as firewall services, intrusion prevention system (IPS) services, intrusion detection system (IDS), IPS/IDS services, server load balancing services, LAN optimization services, VPN services, video optimization services, network address translation (NAT) services, encryption services, decryption services, etc., among many other possibilities, as would be known to one of skill in the art. Each of these services may be independently activated, independently bypassed, or manually selected, as desired by a system administrator upon drafting the ACL.

In operation 506, the one or more policies associated with the flow identifier are applied. The application of the one or more policies may include determining what each policy indicates as an action to perform. Some exemplary actions include, but are not limited to, directions on how to handle the overlay packet or inner packet(s) thereof, instructions on what to do with the overlay packet or inner packet(s) thereof, routing information on where to send the overlay packet or inner packet(s) thereof, switching information on where to forward the overlay packet or inner packet(s) thereof, further characteristics to determine about the overlay packet or inner packet(s) thereof, services to perform on the overlay packet or inner packet(s) thereof, or any other appropriate actions to take in response to receiving the overlay packet.

In one embodiment, applying the one or more policies associated with the flow identifier may comprise performing policy specific actions on the overlay packet (and possibly one or more inner packets thereof) including forwarding the overlay packet and/or one or more inner packets thereof to a device specified in the one or more policies. In this way, the overlay packet may be routed to a device capable of performing some action, either on the overlay packet or on the one or more inner packets thereof.

According to another embodiment, the method 500 may further include receiving a set of flow identifiers and associated policy identifiers from a policy server prior to receiving the overlay packet and storing the set of flow identifiers and associated policy identifiers in a policy and flow database. The set of flow identifiers may correspond to typical overlay traffic for a particular device receiving the set of flow identifiers and associated policy identifiers. In other embodiments, the set of flow identifiers may include all flow identifiers for the entire overlay network, flow identifiers for traffic specific between a source and destination device only, flow identifiers for a particular network segment, flow identifiers for a specific customer's traffic, etc. Any subset of all the flow identifiers for the entire overlay network may be received and stored to the policy and flow database.

In one embodiment, the flow and policy database may include the information shown in exemplary table 710 shown in FIG. 7B, according to one embodiment. In this exemplary table 710, a plurality of bucket identifiers (IDs) are associated with a flow ID and a policy ID. Each policy ID may be associated with a particular policy, as shown in exemplary policy database 700 shown in FIG. 7A.

Referring now to FIGS. 7A-7B, as an example, the DEFAULT_POLICY is associated with Policy ID 0000 in the Policy Table 700. Then, Flow ID 0xFFFFFFFFFFFFFFFF is associated with Policy ID 0x0001, which then has no Bucket ID, indicating that the packet should be dropped. For other Flow IDs, by following the Bucket ID pointer to corresponding information stored in memory relating to the particular Bucket ID, a system is capable of determining what the policy or policies are for any particular Flow ID.

The other identifiers are representative only, and not meant to be limiting in any way. Similarly, the policy names are also representative only, and not meant o be limiting in any way, nor their relationship to Policy IDs, Flow IDs, or Bucket IDs.

Referring again to FIG. 5, in operation 504, when the one or more policies associated with the flow identifier are determined, this determination may be made by analyzing the policy and flow database to determine if any policy identifiers are associated with the flow identifier.

Figure 6:
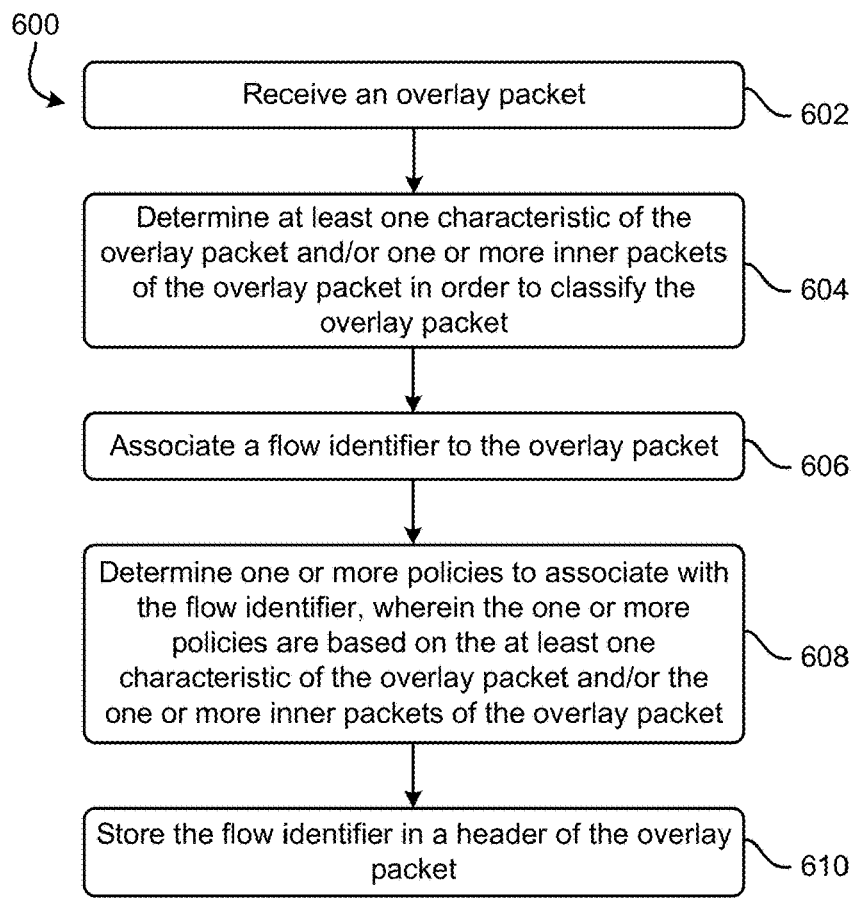
FIG. 6 is a flowchart of a method, according to one embodiment.

Now referring to FIG. 6, a flowchart of a method 600 for classifying traffic in an overlay network is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by an overlay switch, a processor (such as a CPU, an ASIC, a FPGA, etc.), an end point station (such as a Hypervisor, virtual overlay network gateway, overlay switch capable of originating or terminating a tunnel, etc.), or computer program code embedded in a computer readable storage medium, in various non-limiting approaches.

As shown in FIG. 6, method 600 may initiate with operation 602, where an overlay packet is received. In one embodiment, the overlay packet may be received at a policy server, such as an OpenFlow Controller that adheres to OpenFlow standards. The policy server is capable of determining and distributing flow IDs and policies associated therewith to devices in the overlay network, as described herein.

In one embodiment, the overlay packet may lack a flow ID when it is received, e.g., there is no flow ID associated with the overlay packet.

In operation 604, at least one characteristic of the overlay packet and/or one or more inner packets of the overlay packet are determined in order to classify the overlay packet. The characteristic(s) may include, but are not limited to, a source address, a destination address, an overlay network ID, a packet size, a packet type, information contained in headers of the packet, etc. The classification of the overlay packet may include determining one or more policies for the overlay packet. The policies may be included as ACLs, in one embodiment.

In operation 606, a flow ID is associated to the overlay packet. The flow ID, in one approach, may be a unique binary, numeric, alphanumeric, hexadecimal, or some other form of identifier. In one embodiment, the flow ID may be a 64-bit integer, but is not so limited. In some other embodiments, the flow ID may be an 8-bit, 16-bit, 32-bit, 128-bit, 256-bit, or larger integer.

In various embodiments, the flow ID may be unique to the entire overlay network, to a virtual network, to a portion of the overlay network, to an entire data center, globally unique, etc.

In operation 608, one or more policies to associate with the flow identifier are determined. The one or more policies may be based on the at least one characteristic of the overlay packet and/or the one or more inner packets of the overlay packet, which is to say, indirectly, the one or more policies may be based on the classification of the overlay packet.

In operation 610, the flow identifier is stored in a header of the overlay packet. Any header may be used, such as within an overlay network header, an outermost L2 header, an outermost IP header, or an outermost UDP header of the overlay packet, etc.

In accordance with another embodiment, the method 600 may further include determining a set of flow identifiers and associated policy identifiers appropriate for a first device in the overlay network and sending the set of flow identifiers and associated policy identifiers to the first device. The set of flow identifiers may correspond to typical overlay traffic received by or sent from the first device, in one approach. In other approaches, the set of flow identifiers may correspond to the entire overlay network, to a particular virtual network used by the first device (e.g., traffic for the virtual network is sent through the first device), to a portion of the overlay network which is served by the first device, to the entire data center, etc.

In a further embodiment, the method 600 may further include determining policy IDs for each of the one or more associated policies from a policy database and storing the flow ID and the one or more policy IDs to a policy and flow database. The policy and flow database may include policy IDs and associated policies, as shown according to an exemplary embodiment in FIG. 7B. In this exemplary embodiment, the policy and flow database 710 comprises bucket identifiers, each bucket identifier associated with a flow identifier and a policy identifier, and the bucket identifiers point to locations where routing information related to associated policy identifiers are stored. Of course, other database structures may be used, as would be understood by one of skill in the art upon reading the present descriptions.

Referring now to FIGS. 5-6, according to further embodiments, either of methods 500 or 600 may be executed from a computer program product using a processor capable of executing such computer readable program code. For example, a computer program product for managing traffic on an overlay network may include a computer readable storage medium having computer readable program code embodied therewith. The computer readable program code may comprise some or all of computer readable program code configured for determining a flow identifier associated with an overlay packet, computer readable program code configured for determining one or more policies associated with the flow identifier, computer readable program code configured for applying the one or more policies associated with the flow identifier, computer readable program code configured for receiving a set of flow identifiers and associated policy identifiers from a policy server prior to receiving the overlay packet, and/or computer readable program code configured for storing the set of flow identifiers and associated policy identifiers in a policy and flow database.

In one embodiment, the set of flow identifiers may correspond to typical overlay traffic for a particular device receiving the set of flow identifiers and associated policy identifiers, and the computer readable program code configured for determining the one or more policies associated with the flow identifier may comprise computer readable program code configured for analyzing the policy and flow database to determine if any policy identifiers are associated with the flow identifier.

Furthermore, the flow identifier may be stored in a header of the overlay packet. In another embodiment, the computer readable program code configured for applying the one or more policies associated with the flow identifier may comprise computer readable program code configured for routing the overlay packet or one or more inner packets thereof to a device specified in the one or more policies.

According to another embodiment, if no flow identifier is associated with the overlay packet or if no policy is associated with the flow identifier, the overlay packet may be sent to a policy server for further processing.

Figure 8:
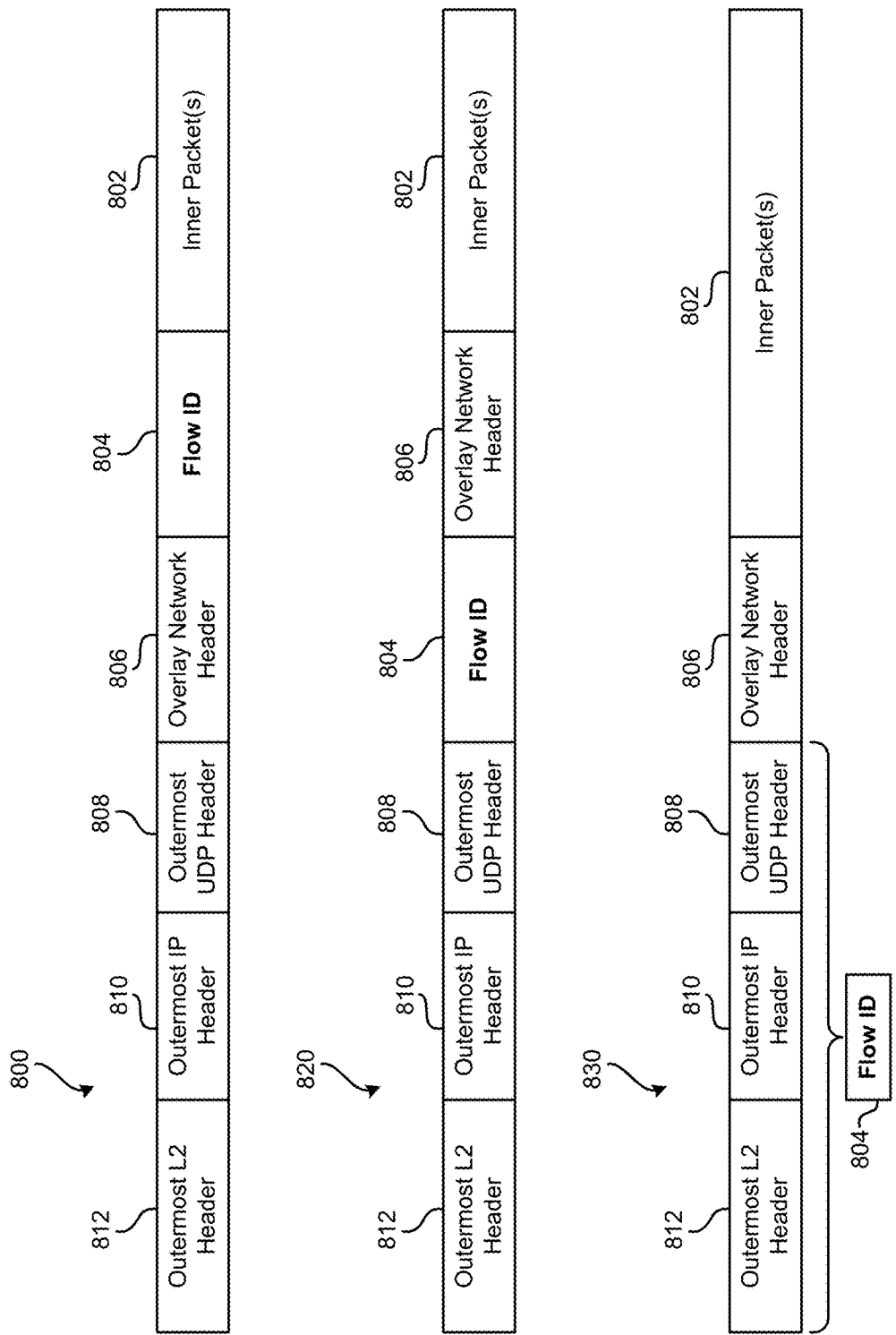
FIG. 8 includes simplified schematics of frame formats for overlay packets including a flow identifier, according to one embodiment.

Now referring to FIG. 8, a Flow ID 804 is stored to an overlay packet header in various locations, according to various embodiments. The storage of the Flow ID 804 may be stored in a header of the overlay packet in a manner which does not violate existing standards. In overlay packet 800, the Flow ID 804 is stored within an Overlay Network Header 806. In overlay packet 820, the Flow ID 804 is stored within an Outermost UDP Header 808. In overlay packet 830, the Flow ID 804 is stored within one of an outermost L2 Header 812, an Outermost IP Header 810, and/or an Outermost UDP Header 808, according to various approaches. Inside each of the overlay packets 800, 820, 830, one or more Inner Packets 802 are stored.

In other embodiments, the Flow ID 804 may be stored to other portions of the overlay packet or the overlay packet headers, as would be understood by one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a hardware processor; and
logic integrated with the hardware processor, executable by the hardware processor, or integrated with and executable by the hardware processor, the logic being configured to cause the hardware processor to:
receive a set of flow identifiers and associated policy identifiers from a policy server prior to receiving an overlay packet;
store the set of flow identifiers and associated policy identifiers in a policy and flow database, where each flow identifier in the set of flow identifiers is unique from all other flow identifiers in the set of flow identifiers;
determine a flow identifier associated with the overlay packet;
analyze the policy and flow database to determine whether at least one policy identifier is associated with the flow identifier by comparing the flow identifier to the received set of flow identifiers and associated policy identifiers within the policy and flow database;
apply at least one policy associated with the flow identifier in response to a determination that the at least one policy identifier is associated with the flow identifier; and send the overlay packet to a policy server for further processing in response to a determination that no flow identifier is associated with the overlay packet or in response to a determination that no policy identifier is associated with the flow identifier, wherein the flow identifier is stored in a header of the overlay packet, and wherein the flow identifier is a numeric, alphanumeric, or hexadecimal string of a predetermined length, the flow identifier being unique from all other flow identifiers in a particular overlay network and associated with an identified flow of the overlay packet.

2. The system as recited in claim 1, wherein the logic is further configured to cause the hardware processor to send the overlay packet to a destination device specified in the header of the overlay packet after applying the at least one policy.

3. The system as recited in claim 1, wherein the flow identifier is stored within an overlay network header, an outermost layer-2 header, an outermost internet protocol (IP) header, or an outermost user datagram protocol (UDP) header of the overlay packet.

4. The system as recited in claim 1, wherein the logic configured to cause the hardware processor to apply the at least one policy associated with the flow identifier is further configured to cause the hardware processor to route the overlay packet or at least one inner packet thereof to a device specified in the at least one policy.

5. A method for managing traffic in an overlay network, the method comprising:

receiving a set of flow identifiers and associated policy identifiers from a policy server prior to receiving an overlay packet;

storing the set of flow identifiers and associated policy identifiers in a policy and flow database, where each flow identifier in the set of flow identifiers is unique from all other flow identifiers in the set of flow identifiers;

determining a flow identifier associated with the overlay packet;

analyzing the policy and flow database to determine whether at least one policy identifier is associated with the flow identifier by comparing the flow identifier to the received set of flow identifiers and associated policy identifiers within the policy and flow database;

applying at least on policy associated with the flow identifier in response to a determination that the at least one policy identifier is associated with the flow identifier; and sending the overlay packet to a policy server for further processing in response to a determination that no flow identifier is associated with the overlay packet or in response to a determination that no policy identifier is associated with the flow identifier, wherein the flow identifier is stored in a header of the overlay packet, and wherein the flow identifier is a string of characters of a predetermined length, the flow identifier being unique from all other flow identifiers in a particular overlay network and associated with an identified flow of the overlay packet.

6. The method as recited in claim 5, further comprising sending the overlay packet to a destination device specified in the header of the overlay packet after applying the at least one policy.

7. The method as recited in claim 5, wherein the flow identifier is stored within an overlay network header, an outermost layer-2 header, an outermost internet protocol (IP) header, or an outermost user datagram protocol (UDP) header of the overlay packet.

8. The method as recited in claim 5, wherein applying the at least one policy associated with the flow identifier comprises performing policy specific actions on the overlay packet or at least one inner packet thereof including forwarding the overlay packet or the at least one inner packet thereof to a device specified in the at least one policy.

9. A computer program product for managing traffic on an overlay network, the computer program product comprising a non-transitory computer readable storage medium having computer readable program code embodied therewith, the embodied computer readable program code comprising:

computer readable program code configured to receive a set of flow identifiers and associated policy identifiers from a policy server prior to receiving an overlay packet;

computer readable program code configured to store the set of flow identifiers and associated policy identifiers in a policy and flow database, where each flow identifier in the set of flow identifiers is unique from all other flow identifiers in the set of flow identifiers;

computer readable program code configured to determine a flow identifier associated with the overlay packet;

computer readable program code configured to analyze the policy and flow database to determine whether at least one policy identifier is associated with the flow identifier by comparing the flow identifier to the received set of flow identifiers and associated policy identifiers within the policy and flow database;

computer readable program code configured to apply at least one policy associated with the flow identifier in response to a determination that the at least one policy identifier is associated with the flow identifier; and computer readable program code configured to send the overlay packet to a policy server for further processing in response to a determination that no flow identifier is associated with the overlay packet or in response to a determination that no policy identifier is associated with the flow identifier, wherein the flow identifier is stored in a header of the overlay packet, and wherein the flow identifier is a numeric, alphanumeric, or hexadecimal string of a predetermined length, the flow identifier being unique from all other flow identifiers in a particular overlay network and associated with an identified flow of the overlay packet.

10. The system as recited in claim 1, wherein:

the policy and flow database comprises a plurality of bucket identifiers, where each of the plurality of bucket identifiers is associated with one of the set of flow identifiers and one of the associated policy identifiers, and points to a location where routing information related to the associated policy identifier is stored.

11. The system as recited in claim 1, wherein the set of flow identifiers include a subset of all flow identifiers for an entire overlay network that are associated with traffic of a predetermined entity.

12. The system as recited in claim 1, wherein the set of flow identifiers include a subset of all flow identifiers for an entire overlay network that are associated with traffic between a specific source and destination device.

13. The system as recited in claim 1, wherein the set of flow identifiers include a subset of all flow identifiers for an entire overlay network that are associated with a predetermined segment of the overlay network.

\* \* \* \* \*